(12) United States Patent
Miyata

(10) Patent No.: US 6,514,168 B2
(45) Date of Patent: Feb. 4, 2003

(54) TOROIDAL TYPE CONTINUOUS VARIABLE SPEED TRANSMISSION

(75) Inventor: Shinji Miyata, Fujisawa (JP)

(73) Assignee: NSK Ltd., Tokyo (JP)

(*) Notice: Subject to any disclaimer, the term of this patent is extended or adjusted under 35 U.S.C. 154(b) by 0 days.

(21) Appl. No.: 09/850,148

(22) Filed: May 8, 2001

(65) Prior Publication Data

US 2001/0041642 A1 Nov. 15, 2001

(30) Foreign Application Priority Data

May 9, 2000 (JP) ........................ 2000-136068

(51) Int. Cl.[7] ............................................. F16H 37/02
(52) U.S. Cl. ............................... 475/216; 476/10
(58) Field of Search ........................... 475/216; 476/2, 476/10

(56) References Cited

U.S. PATENT DOCUMENTS

| | | | |
|---|---|---|---|
| 4,955,246 A | | 9/1990 | Nakano |
| 5,178,043 A | | 1/1993 | Nakano ................. 475/132 |
| 5,464,375 A | * | 11/1995 | Nakano ................. 476/10 |
| 5,888,160 A | * | 3/1999 | Miyata et al. .......... 475/216 |
| 5,902,207 A | * | 5/1999 | Sugihara ............... 476/10 |
| 6,146,307 A | * | 11/2000 | Takizawa et al. ...... 477/37 |
| 6,171,210 B1 | | 1/2001 | Miyata et al. .......... 475/216 |
| 6,196,945 B1 | * | 3/2001 | Mori et al. ............ 476/10 |
| 6,287,232 B1 | * | 9/2001 | Sakai et al. ........... 475/216 |
| 6,358,179 B1 | * | 3/2002 | Sakai et al. ........... 475/216 |
| 6,370,468 B1 | * | 4/2002 | Koga et al. ............ 477/43 |

FOREIGN PATENT DOCUMENTS

| | | |
|---|---|---|
| JP | 62-71465 | 5/1987 |
| JP | 1-169169 | 7/1989 |
| JP | 1-173552 | 12/1989 |
| JP | 1-312266 | 12/1989 |
| JP | 4-78366 | 3/1992 |
| JP | 6-257661 | 9/1994 |
| JP | 10-196759 | 7/1998 |
| JP | 11-63146 | 3/1999 |

* cited by examiner

Primary Examiner—Sherry Estremsky
(74) Attorney, Agent, or Firm—Miles & Stockbridge P.C.

(57) ABSTRACT

In a toroidal type continuous variable speed transmission, a control valve for displacing trunnions is controlled by supporting and fixing a precess cam at an end of a rod displaced together with one of the trunnions. Therefore, when the torque inputted to the toroidal type continuous variable speed transmission is greatly varied by the treading on or releasing of the accelerator, there is the risk that an unnecessary variation of the gear ratio invite an abrupt change in engine revolutions and a consequent uncomfortable feeling on the part of the driver. A tip of a link arm is brought into contact with the cam face of a precess cam, and the control valve is switched according to any variation of the trunnion. Further, the contact position between the cam face and the tip of the link arm is placed closer to the input side disk side. This configuration makes it possible to suppress the influence of elastic deformation of trunnions and to solve the problem noted above.

3 Claims, 15 Drawing Sheets

TOROIDAL TYPE CONTINUOUS VARIABLE SPEED TRANSMISSION

BACKGROUND OF THE INVENTION

1. Field of the Invention

The present invention relates to a toroidal type continuous variable speed transmission utilized for a transmission unit constituting an automatic transmission utilized for a transmission unit use in automobiles, and more particularly to a toroidal type continuous variable speed transmission for reducing the driver's uncomfortable feeling by restraining variations in gear ratio attributable to trunnions and elastic deformation.

2. Description of the Related Art

A toroidal type continuous variable speed transmission, illustrated in FIGS. 1 and 2, to be used as an automatic transmission for automobiles is implemented in some vehicles. In this toroidal type continuous variable speed transmission, as disclosed in the Japanese Utility Model Laid-Open No. 62-71465, an input side disk 2 is supported concentrically with an input shaft 1, and an output side disk 4 is fixed to an end of an output shaft 3 arranged concentrically with this input shaft 1. Within a casing 5, accommodating the toroidal type continuous variable speed transmission as shown in FIG. 4 to be described later on, there are provided trunnions 7, each rocking around an axis 6. The axes 6 are in an isolated positional relationship having certain angles with the directions of the input shaft 1 and the output shaft 3. Hereinafter in this specification, lines in an isolated positional relationship having certain angles will be referred to as skew lines.

Each of the trunnions 7 has a pair of axes 6 on the outer faces of its both ends, the axes 6 being arranged concentrically for each trunnion 7. The central axis linking paired axes 6 does not cross the central axis of the input side disk 2 and the output side disk 4, but is a skew line at an exactly or substantially right angle with the direction of the central axis of the input side disk 2 and the output side disk 4. The central part of each of the trunnions 7 supports the base half of a displacement shaft 8, whose inclination angle can be freely controlled by rocking the trunnion 7 around the axes 6. Around the outer halves of the displacement shafts 8, each supported by one of the trunnions 7, power rollers 9 are supported rotatably. Each of these power rollers 9 is held between the inner face 2a of the input side disk 2 and the inner face 4a of the output side disk 4.

Each of the mutually opposing inner faces 2a and 4a of the input side and output side disks 2 and 4, respectively, forms a concavity having a circular section, obtained by rotating an arc or an arc-like curve centering on the axis 6. The circumferential face 9a of each of the power rollers 9, formed in a spherical convexity, is kept in contact with the inner faces 2a and 4a. Between the input shaft 1 and the input side disk 2 is provided a pressing device 10, such as a loading cam device, and the input side disk 2 is driven rotatably while being elastically pressed by this pressing device 10 toward the output side disk 4.

When the toroidal type continuous variable speed transmission configured as described above is used, the pressing device 10 turns the input side disk 2 while pressing it against the plurality of power rollers 9 along with the rotation of the input shaft 1. The rotation of this input side disk 2 is transmitted to the output side disk 4 via the plurality of power rollers 9, and the output shaft 3 fixed to this output side disk 4 turns.

To describe how the turning speeds of the input shaft 1 and the output shaft 3 are varied, first where the input shaft 1 and the output shaft 3 are to be decelerated, the trunnions 7 are rocked around the axes 6, and each displacement shaft 8 is inclined so that the circumferential faces 9a of the power rollers 9 come into contact with the closer-to-the-center part of the inner face 2a of the input side disk 2 and the closer-to-the-periphery part of the inner face 4a of the output side disk 4 as shown in FIG. 1.

Conversely, where they are to be accelerated, each of the trunnions 7 is rocked, and each displacement shaft 8 is inclined so that the circumferential faces 9a of the power rollers 9 come into contact with the closer-to-the-periphery part of the inner face 2a of the input side disk 2 and the closer-to-the-center part of the inner face 4a of the output side disk 4 as shown in FIG. 2. If the angle of inclination of each displacement shaft 8 is selected between the angles shown in FIG. 1 and FIG. 2, an intermediate gear ratio can be obtained between the input shaft 1 and the output shaft 3.

Further, FIGS. 3 and 4 illustrate more specifically a toroidal type continuous variable speed transmission, described in the microfilm version of the Japanese Utility Model Application No. 63-69293 (Japanese Utility Model Laid-Open No. 1-173552). The input side disk 2 and the output side disk 4 are rotatably supported by a tubular input shaft 11. A pressing device 10 is provided between an end part of this input shaft 11 and the input side disk 2. On the other hand, an output gear 12 is coupled with the output side disk 4, and they rotate in synchronism.

Axes 6 provided at two ends of a pair of trunnions 7 concentrically with each other are supported by a pair of yokes 13 rockingly and rotatably in axial directions (the direction normal to the surface of FIG. 3 and the vertical direction in FIG. 4). A middle part of each of the trunnions 7 supports the base half of a displacement shaft 8. The base half and the outer half of each of the displacement shafts 8 are mutually eccentric. The base half is rotatably supported by the middle part of each trunnion 7, whose outer half rotatably supports power rollers 9. Between the end parts of the trunnions 7 is stretched a synchronous cable 27 diagonally so that the angles of inclination of these trunnions 7 can be mechanically synchronized.

The pair of displacement shafts 8 are positioned 180 degrees reverse to the input shaft 11. The direction in which the base half and the outer half of each of these displacement shafts 8 are eccentric is in the same direction as the turning directions of the input side and output side disks 2 and 4 (vertically reverse in FIG. 4). The direction of eccentricity is substantially normal to the direction in which the input shaft 11 is disposed. Therefore, the power rollers 9 are supported somewhat rotatably in the direction in which the input shaft 11 is disposed.

Between the outer face of each of the power rollers 9 and the inner face of the middle part of each of the trunnions 7 are provided, from the outer face of the power roller 9 outward, a thrust ball bearing 14 and a thrust needle bearing 15. Of these bearings, the thrust ball bearing 14, while bearing the load working on the power rollers 9 in the thrust direction, permits these power rollers 9 to turn. Each thrust needle bearing 15, while bearing a thrust load working from the power roller 9 on an outer race 16 constituting part of the thrust ball bearing 14, permits the outer half of each displacement shaft 8 and the outer race 16 to rock around the base half of each displacement shaft 8. Each of the trunnions 7 is made displaceable by a hydraulic actuator (hydraulic cylinder) 17 in the axial direction of the axis 6.

In the toroidal type continuous variable speed transmission configured as described above, the rotation of the input shaft 11 is transmitted to the input side disk 2 via the pressing device 10. The rotation of this input side disk 2 is further transmitted to the output side disk 4 via a pair of power rollers 9, and the rotation of this output side disk 4 is then taken out of the output gear 12.

When the ratio of turning speed between the input shaft 11 and the output gear 12 is to be changed, the paired trunnions 7 are displaced in mutually reverse directions with the actuator 17, for instance to move the power rollers 9 on the righthand side of FIG. 4 toward a lower part of the figure and the power rollers 9 on the lefthand side of FIG. 4 toward an upper part of the figure. As a result, the direction of tangential force working on contact parts between the circumferential faces 9a of these power rollers 9 and the inner faces 2a and 4a of the input side disk 2 and the output side disk 4 changes. Along with this change in the direction of force, the trunnions 7 rock in mutually reverse directions around the axes 6 pivoting on the yoke 13. As a result, the contact positions between the circumferential faces 9a of the power rollers 9 and the inner faces 2a and 4a change as shown in FIGS. 1 and 2, and consequently the ratio of turning speed between the input shaft 11 and the output gear 12 changes.

The feeding and discharging of pressurized oil to the actuators 17 are controlled with a single control valve irrespective of the number of actuators 17, and the motion of one of the trunnions 7 is fed back to this control valve. Whereas the structure of this part is described in, for instance Japanese Patent Application Laid-Open No. 6-257661, and accordingly known to those skilled in the art, a second example of specific structure according to the prior art will now be briefly described with reference to FIG. 7. A control valve 18 has a sleeve 20, which is displaced in the axial direction (the lateral direction in FIG. 7) by a stepping motor 19 and a spool 21 fitted displaceably in the axial direction on the bore side of this sleeve 20. A precess cam 23 is fitted to an end of a rod 22 attached to one of the trunnions 7, and there is configured a feedback mechanism which transmits the motion of the rod 22 to the spool 21 via this precess cam 23 and a link arm 24.

When the gear ratio is to be changed, the sleeve 20 is displaced by a prescribed quantity with the stepping motor 19 to open the channel of the control valve 18. As a result, pressurized oil is fed into each of the actuators 17 in a prescribed direction, and the actuators 17 displace the trunnions 7 in a prescribed direction. Thus, along with the feeding of the pressurized oil, each of the trunnions 7, while being displaced in the axial direction of the axis 6, rocks around the axis 6. Then the motions of one of the trunnions 7 (in the axial direction and in rocking displacement) are transmitted to the spool 21 via the precess cam 23 fitted to one end of the rod 22 and the link arm 24 to displace this spool 21 in the axial direction. As a result, the channel of the control valve 18 is closed in a state in which the trunnions 7 have been displaced by a prescribed quantity, and the feeding or discharging of to or from the actuator 17 is stopped. Therefore the displacement quantities of the trunnions 7 in the axial direction and the rocking direction will now be no more than what corresponds to the quantity of displacement of the sleeve 20 by the stepping motor 19.

During power transmission by the toroidal type continuous variable speed transmission, the power rollers 9 are displaced in the axial direction of the input shaft 11 according to the elastic deformations of various constituent elements. Then the displacement shafts 8 supporting the power rollers 9 slightly turn around their respective base halves. As a result of this turn, the outer faces of the outer races of the thrust ball bearings 14 and the inner faces of the trunnions 7 are displaced relative to each other. As there are the thrust needle bearings 15 between these outer faces and inner faces, the force required for these relative displacements is small.

Further, the so-called double cavity structure to increase the transmissible torque by providing, as illustrated in FIGS. 5 through 7, two each of input side disks 2A and 2B and output side disks 4 around an input shaft 11a and arranging in parallel, with respect to the direction of power transmission, the input side disk 2A and 2B and the output side disks 4 is also known according to the prior art. This structure shown in FIGS. 5 through 7 supports an output gear 12a around the middle part of the input shaft 11a and rotatably with respect to the input shaft 11a, and the output side disks 4 are spline-engaged with the two ends of a cylindrical portion provided in the core part of this output gear 12a. The input side disks 2A and 2B are supported at the two ends of the input shaft 11a to be rotatable with this input shaft 11a. This input shaft 11a is rotationally driven by a driving shaft 25 via the loading cam type pressing device 10.

In the above-described double cavity toroidal type continuous variable speed transmission, large power can be transmitted because power transmission from the input shaft 11a to the output gear 12a is accomplished over two lines, from one input side disk 2A to one output side disk 4 and from the other input side disk 2B to the other output side disk 4. In such a double cavity toroidal type continuous variable speed transmission, too, for a gear change, the trunnions 7 are displaced in the axial direction of the axes 6 by the hydraulic actuators 17. Only one control valve 18 for controlling the feeding and discharging of pressurized oil to and from the actuators 17 is provided for the whole toroidal type continuous variable speed transmission as mentioned above. This single control valve 18 controls the feeding and discharging of pressurized oil to and from the plurality of actuators 17.

For incorporation of the toroidal type continuous variable speed transmission configured and operating as described into an actual continuous variable speed transmission for automotive use, its combination with a planetary gear mechanism to configure a continuous variable speed transmission has been proposed according to the prior art as described in Japanese Patent Application Laid-Open No. 1-169169, Japanese Patent Application Laid-Open No. 1-312266, Japanese Patent Application Laid-Open No. 10-196759, Japanese Patent Application Laid-Open No. 11-63146 among others. That is, when the vehicle is running at low speed, the driving force of the engine is transmitted by the toroidal type continuous variable speed transmission alone, and when it is running fast, the driving force is transmitted by the planetary gear mechanism, so that the torque working on the toroidal type continuous variable speed transmission during fast running can be reduced. This configuration can contribute to increasing the durability of the constituent elements of the toroidal type continuous variable speed transmission.

FIG. 8 illustrates the Continuous variable speed transmission described in Japanese Patent Application Laid-Open No. 10-196759 out of the references cited above. This continuous variable speed transmission has a start clutch 30 arranged between the output side end (the right end in FIG. 8) of the crankshaft 28 of an engine 26, which is the source of driving force, and the input side end (the left end in FIG.

8) of an input shaft 29. An output shaft 31 for taking out the motive force deriving from the rotation of the input shaft 29 is arranged in parallel with this input shaft 29. Around this input shaft 29 is provided a toroidal type continuous variable speed transmission 32, and around the output shaft 31, a planetary gear mechanism 33.

A cam plate 34 constituting the pressing device 10 for the toroidal type continuous variable speed transmission 32 is fixed to a part toward the output side end (toward the right in FIG. 8) in the middle part of the input shaft 29. These input side disk 2 and output side disk 4 are rotatably supported by bearings not shown, including needle bearings, around the input shaft 29 independently of each other with respect to this input shaft 29. The cam plate 34 and the input side disk 2 constitute the pressing device 10. Therefore, the input side disk 2, along with the rotation of the input shaft 29, rotates while being pressed against the output side disk 4. Further, a plurality of power rollers 9 are held between the inner face 2a of the input side disk 2 and the inner face 4a of the output side disk 4 to constitute the toroidal type continuous variable speed transmission 32 described above with reference to FIGS. 3 and 4. This toroidal type continuous variable speed transmission 32 is not limited to single cavity type structures illustrated in FIGS. 8, 3 and 4, but may as well have the double cavity structure described above with reference to FIGS. 5 and 6. A continuous variable speed transmission into which a double cavity toroidal type continuous variable speed transmission is incorporated is described in Japanese Patent Application Laid-Open No. 11-63146 cited above among others.

A sun gear 35 constituting the core of the planetary gear mechanism 33 is fixed to the input side end (the right end in FIG. 8) of the output shaft 31. Therefore, this output shaft 31 rotates along with the rotation of the sun gear 35. Around this sun gear 35 are supported a ring gear 36 concentrically and rotatably with the sun gear 35. Between the inner circumferential faces of these ring gear 36 and the outer circumferential face of the sun gear 35 are provided a plurality of (usually three or four) planetary gear sets 37. In the illustrated example, each of these planetary gear sets 37 consists of a pair of planetary gears 38a and 38b. These paired planetary gears 38a and 38b are engaged with each other, while the externally arranged planetary gear 38a is engaged with the ring gear 36 and the internally arranged planetary gear 38b is engaged with the sun gear 35. This configuration of each planetary gear set 37 comprising a pair of planetary gears 38a and 38b is intended to align the turning directions of the ring gear 36 and of the sun gear 35. Therefore, if relations with other constituent elements make it unnecessary to align the turning directions of the ring gear 36 and of the sun gear 35, a single planetary gear may be engaged with both the ring gear 36 and the sun gear 35 instead. The planetary gear sets 37 described above are supported rotatably on one side face (the right side face in FIG. 8) of a carrier 39. This carrier 39 is rotatably supported by the middle part of the output shaft 31.

The carrier 39 and the output side disk 4 are connected by a first power transmission mechanism 40 in a state where rotational force can be transmitted. The first power transmission mechanism 40 constituting a first power transmission path stated in claim 2 of the cited specification is configured of mutually engaged first and second gears 41 and 42. Therefore, the carrier 39 turns at a speed matching the numbers of teeth of the first and second gears 41 and 42 along with the rotation of the output side disk 4 in the direction reverse to that of this output side disk 4.

On the other hand, the input shaft 29 and the ring gear 36 can be connected by a second power transmission mechanism 43 in a state permitting transmission of rotational force. The second power transmission mechanism 43, which constitutes a second power transmission path stated in claim 2 of the cited specification, is configured of first and second sprockets 44 and 45 and a chain 46 spanning between these two sprockets 44 and.45. Thus, the first sprocket 44 is fixed to a part projecting from the cam plate 34 at the output side end (the right end in FIG. 8) of the input shaft 29, and the second sprocket 45 is fixed to the input side end (the right end in FIG. 8) of a transmission shaft 47. Therefore, this transmission shaft 47 turns along with the rotation of the input shaft 29 in the same direction as this input shaft 29 at a speed matching the numbers of teeth of the first and second sprockets 44 and 45.

The continuous variable speed transmission is provided with a clutch mechanism constituting mode switching member stated in claim 2 of the cited specification. This clutch mechanism connects either, not both, the carrier 39 or the transmission shaft 47, which is a constituent member of the second power transmission mechanism 43, to the ring gear 36. In the structure illustrated in FIG. 8, this clutch mechanism consists of a low speed clutch 48 and a high speed clutch 49. Of these clutches, the low speed clutch 48 is provided between the outer periphery of the carrier 39 and one end of the ring gear 36 in the axial direction (the left end in FIG. 8). This low speed clutch 48, when engaged, prevents relative displacement among the sun gear 35 and the ring gear 36 constituting the planetary gear mechanism 33 relative to the planetary gear sets 37, and integrally couples these sun gear 35 and ring gear 36. The high speed clutch 49 is provided between the transmission shaft 47 and the central axis 51 fixed to the ring gear 36 via a yoke 50. Of these low speed clutch 48 and high speed clutch 49, when one of them is engaged, the other is disengaged.

In the example of FIG. 8, a reverse clutch 52 is provided between the ring gear 36 and fixed parts including a housing (not shown) for the continuous variable speed transmission. This reverse clutch 52 is provided to turn the output shaft 31 in the reverse direction to cause the vehicle to run backward. This reverse clutch 52 is disengaged when either the low speed clutch 48 or the high speed clutch 49 is engaged. When this reverse clutch 52 is engaged, both the low speed clutch. 48 and the high speed clutch 49 are disengaged.

Further in the illustrated example, the output shaft 31 and a differential gear 53 are connected to a third power transmission mechanism 57 consisting of third through fifth gears 54 through 56. Therefore, when the output shaft 31 rotates, a pair of driving shafts 58 are turned via these third power transmission mechanism 57 and differential gear 53 to cause the driving wheels of the vehicle to rotate.

In the continuous variable speed transmission configured as described above, first in running at low speed, the low speed clutch 48 is engaged, and the high speed clutch 49 and the reverse clutch 52 are disengaged. When the start clutch 30 is connected and the input shaft 29 is turned, only the toroidal type continuous variable speed transmission 32 transmits power from this input shaft 29 to the output shaft 31. The action itself to change the gear ratio between the input side and output side disk 2 and 4 during such slow running is the same as the corresponding action in the case of the conventional toroidal type continuous variable speed transmission described above with reference to FIGS. 3 and 4. In this state, of course, the gear ratio between the input shaft 29 and the output shaft 31, i.e. the total gear ratio of the continuous variable speed transmission, is proportional to the gear ratio of the toroidal type continuous variable speed transmission 32. In this state, the torque inputted to this toroidal type continuous variable speed transmission 32 is equal to the torque applied to the input shaft 29.

During fast running, the high speed clutch 49 is engaged, and the low speed clutch 48 and the reverse clutch 52 are disengaged. In this state, the start clutch 30 is also engaged. When the input shaft 29 is turned then, power is transmitted from the input shaft 29 to the output shaft 31 by the first and second sprockets 44 and 45 and the chain 46 constituting the second power transmission mechanism 43 and the planetary gear mechanism 33.

That is, when the input shaft 29 turns during the fast running, this rotation is transmitted via the second power transmission mechanism 43 and the high speed clutch 49 to the central axis 51, and causes the ring gear. 36 fixed to the central axis 51 to turn. The rotation of the ring gear 36 is transmitted via the plurality of planetary gear sets 37 to the sun gear 35, and causes the output shaft 31 to which this sun gear 35 is fixed to rotate. Supposing that the planetary gear sets 37 are at halt (they do not revolve around the sun gear 35) when the ring gear 36 comes to the input side, the planetary gear mechanism 33 accelerates at a gear ratio matching the ratio of the numbers of teeth between the ring gear 36 and the sun gear 35. However, the planetary gear sets 37 revolve around the sun gear 35, and the total gear ratio of the continuous variable speed transmission varies according to the revolving speed of each of the planetary gear sets 37. Therefore, by varying the gear ratio of the toroidal type continuous variable speed transmission 32 and the revolving speed of the planetary gear sets 37, the total gear ratio of the continuous variable speed transmission can be controlled.

Thus, during the fast running, each of the planetary gear sets 37 revolves in the same direction as the ring gear 36. The lower the revolving speed of the planetary gear sets 37, the higher the rotating speed of the output shaft 31 to which the sun gear 35 is fixed. For instance, if the revolving speed and the rotational speed of the ring gear 36 (both are angular velocities) are equal, the ring gear 36 and the output shaft 31 will turn at the same speed. If the revolving speed is lower than the rotational speed of the ring gear 36, the output shaft 31 will turn faster than the ring gear 36. Conversely, if the revolving speed is higher than the rotational speed of the ring gear 36, the output shaft 31 will turn less fast than the ring gear 36.

Therefore, during the fast running, the more the gear ratio of toroidal type continuous variable speed transmission 32 varies toward the deceleration side, the more will the total gear ratio of the continuous variable speed transmission vary toward the acceleration side. In such a state of fast running, a torque works on the toroidal type continuous variable speed transmission 32 not from the input side disk 2 but from the output side disk 4 (if the torque working at low speed is regarded as a plus torque, a minus torque will work). Thus, in a state wherein the high speed clutch 49 is engaged, the torque transmitted from the engine 26 to the input shaft 29 is transmitted, before the pressing device 10 presses the input side disk 2, to the ring gear 36 of the planetary gear mechanism 33 via the second power transmission mechanism 43. Therefore, almost no torque is transmitted from the input shaft 29 side via the pressing device 10 to the input side disk 2.

On the other hand, part of the torque transmitted via the second power transmission mechanism 43 to the ring gear 36 of the planetary gear mechanism 33 is transmitted from the planetary gear sets 37 via the carrier 39 and the first power transmission mechanism 40 to the output side disk 4. Thus the torque applied from the output side disk 4 to the toroidal type continuous variable speed transmission 32 decreases as the gear ratio of the toroidal type continuous variable speed transmission 32 is varied more toward the deceleration side so as to vary the total gear ratio of the continuous variable speed transmission toward the acceleration side. As a result, by reducing the torque inputted to the toroidal type continuous variable speed transmission 32 during fast running, the durability of the constituent elements of this toroidal type continuous variable speed transmission 32 can be enhanced.

When the output shaft 31 is turned in the reverse direction to cause the vehicle to run backward, the low speed and high speed clutches 48 and 49 are disengaged, and the reverse clutch 52 is engaged. As a result, the ring gear 36 is fixed, and the planetary gear sets 37, being engaged with the ring gear 36 and the sun gear 35, revolve around this sun gear 35. The sun gear 35 and the output shaft 31 to which this sun gear 35 is fixed rotate in the direction reverse to that during the low speed and high speed running.

FIG. 9 illustrates a typical state of variations, with the total gear ratio (itotal) of the continuous variable speed transmission shown in FIG. 8 above being continuously varied, in the gear ratio of the toroidal type continuous variable speed transmission 32 (icvt), the input torque $(T_{in})$ inputted to this toroidal type continuous variable speed transmission 32 and the output torque $(T_s)$ taken out of the output shaft 31 of the continuous variable speed transmission. The relationships among these gear ratios (itotal) and (icvt) and the torques $(T_{in})$ and $(T_s)$ vary with the speed change range of the toroidal type continuous variable speed transmission 32, the structure and tooth number ratio of the planetary gear mechanism 33, and the reduction gear ratio of the second power transmission mechanism 43. As conditions for obtaining the lines drawn in FIG. 9, the speed change range of the toroidal type continuous variable speed transmission 32 was selected to be up to about four times (0.5 to 2.0), the planetary gear mechanism 33 was supposed to be composed of planetary gear sets 37 each consisting of a pair of planetary gears 38a or 38b, and the reduction gear ratio of the second power transmission mechanism 43 was selected to be about two. Switching between the low speed clutch 48 and the high speed clutch 49 was supposed to be done when the total gear ratio (itotal) of the continuous variable speed transmission was one.

In FIG. 9 showing the results of calculation under the conditions stated above, the vertical axis represents the gear ratio (icvt) of the toroidal type continuous variable speed transmission 32 and the ratio between the input torque $(T_{in})$ of the toroidal type continuous variable speed transmission 32 or the output torque $(T_s)$ of the continuous variable speed transmission and the $(T_e)$ transmitted from the engine 26 to the input shaft 29 (FIG. 8) $(T_{in}/T_e)$ or $(T_s/T_e)$, and the horizontal axis, the total gear ratio (itotal) of the continuous variable speed transmission. The negative value of the gear ratio (icvt) of the toroidal type continuous variable speed transmission 32 is because of the reverse direction of the rotation of the output side disk 4 (FIG. 8) incorporated into the toroidal type continuous variable speed transmission 32 to that of the input shaft 29. The solid line a represents the gear ratio (icvt) of the toroidal type continuous variable speed transmission 32; the broken line b, the ratio between the output torque $(T_s)$ and the torque $(T_e)$ transmitted from the engine 26 to the input shaft 29 $(T_s/T_e)$; and the chain line c, the ratio between the input torque $(T_{in})$ and the torque $(T_e)$ transmitted from the engine 26 to the output shaft 29 $(T_{in}/T_e)$. As is evident from the description with reference to FIG. 9, the continuous variable speed transmission described above with reference to FIG. 8 can serve to reduce the torque working on the toroidal type continuous variable speed transmission 32 during fast running. Under the conditions the results shown in FIG. 9 were obtained, the input torque ($T_{in}$) can be reduced at the maximum to about 14% of the torque ($T_e$) transmitted from the engine 26 to the input shaft 29.

The toroidal type continuous variable speed transmission to be used in the state of being incorporated into the continuous variable speed transmission described above involves the risk of unnecessary variation of the gear ratio, irrespective of the open/close control of the control valve 18 by the precess cam 23, under the impact of elastic deformation of constituent elements of the toroidal type continuous variable speed transmission 32 when the input torque varies. This unnecessary variation of the gear ratio might invite an abrupt change in engine revolutions and a consequent uncomfortable feeling on the part of the driver. This point will be explained below with reference to FIGS. 10 and 11.

The precess cam 23 is supported by and fixed to the tip (the right end in FIG. 10) or the rod 22 whose base end (the left end in FIG. 10) is coupled and fixed to one of the trunnions 7. On the other hand, during the operation of the toroidal type continuous variable speed transmission, the trunnion 7 is subjected to a heavy thrust load F from the power rollers 9 supported on its inner face side. The inner face of the trunnion 7 is elastically deformed in the direction of making that side concave according to this thrust load, and according to this elastic deformation the rod 22 whose base end is coupled and fixed to an end of the trunnion 7 is deformed in the direction of arrow a in FIG. 10. Measurement by the present inventor of the displacement of the tip of the rod 22 with a displacement sensor 59 while varying the thrust load applied to the power rollers 9 with both ends of the trunnion 7 being supported as illustrated in FIG. 10 gave the results shown in FIG. 11. That is, the heavier the thrust load, the greater the displacement of the tip of the rod 22, to which the precess cam 23 is to be fitted, in the radial direction.

The prior art gave no consideration to suppressing gear ratio variations due to such displacement of the tip of the rod 22. As a consequence, when the torque inputted to the toroidal type continuous variable speed transmission is greatly varied by the treading on or releasing of the accelerator or otherwise, the resultant unnecessary variation of the gear ratio might invite an abrupt change in engine revolutions and a consequent uncomfortable feeling on the part of the driver as noted above. Especially in the case of the continuous variable speed transmission described above with reference to FIG. 8, an unnecessary variation is more likely to occur when switching between the low speed and high speed modes because the torque transmitted to the toroidal type continuous variable speed transmission 32 is switched between positive and negative values (the direction of the transmission of motive force changes).

The present inventor found by experiment that the fitting posture of the precess cam 23 relative to the rod 22 affected the magnitude of the gear ratio variation, and on that basis invented a toroidal type continuous variable speed transmission capable of suppressing the unnecessary gear ratio variation.

SUMMARY OF THE INVENTION

A toroidal type continuous variable speed transmission according to the present invention, like the known toroidal type continuous variable speed transmissions described above, comprises: an input side disk and an output side disk whose inner faces, each being a concavity having a circular section, oppose each other, each disk being concentrically and rotatably supported; a plurality of trunnions rocking around axes each being skewed with respect to the central axis of these input side disk and output side disk; displacement shafts each supported by a middle part of one or another of the trunnions so as to project from the inner face of the trunnion; power rollers arranged on the inner face side of these trunnions and, in a state of being put between the input side disk and the output side disk, supported rotatably around the displacement shafts, each power roller having a spherically convex circumferential face; hydraulic actuators, one provided for each trunnion to rockingly displace the trunnion by displacing it around an axis in the axial direction and thereby vary the gear ratio between the input side disk and the output side disk; and a control valve for switching the feeding/discharging state of pressurized oil to and from each of the hydraulic actuators. A precess cam is fixed to a member displaced together with one of the trunnions, and a feedback mechanism to transmit the displacement of this precess cam to the control valve via a link arm is provided so as to transmit the motion of the trunnion to this control valve and thereby to make possible switching of the feeding/discharging state by this control valve.

Especially in the toroidal type continuous variable speed transmission according to the invention, the position of contact between the precess cam and the link arm is placed closer to the input side disk than the central axis of the trunnion provided with the precess cam.

The toroidal type continuous variable speed transmission according to the invention is intended to suppress any variation of the gear ratio due to an abrupt change in torque and thereby to reduce a consequent uncomfortable feeling on the part of the driver.

Experiment by the inventor filing this application revealed that, where the position of contact between the precess cam and the link arm was placed closer to the input side disk than the central axis of the trunnion provided with the precess cam, the gear ratio variation could be suppressed more than in the case of placing the position of contact elsewhere, so that the above-noted object could be achieved.

DETAILED DESCRIPTION OF THE INVENTION

<First Embodiment>

Figure 1:
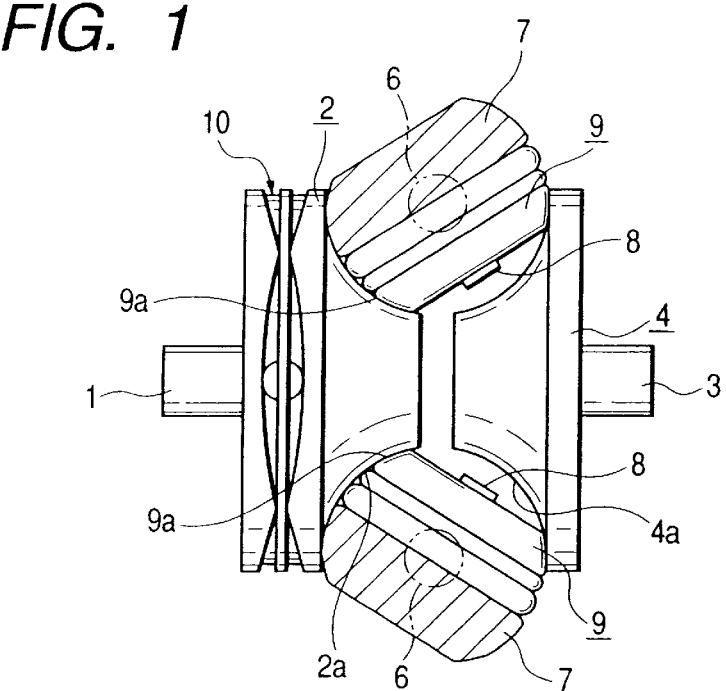
FIG. 1 is a side view of the basic structure of a toroidal type continuous variable speed transmission at the time of maximum deceleration.
Figure 2:
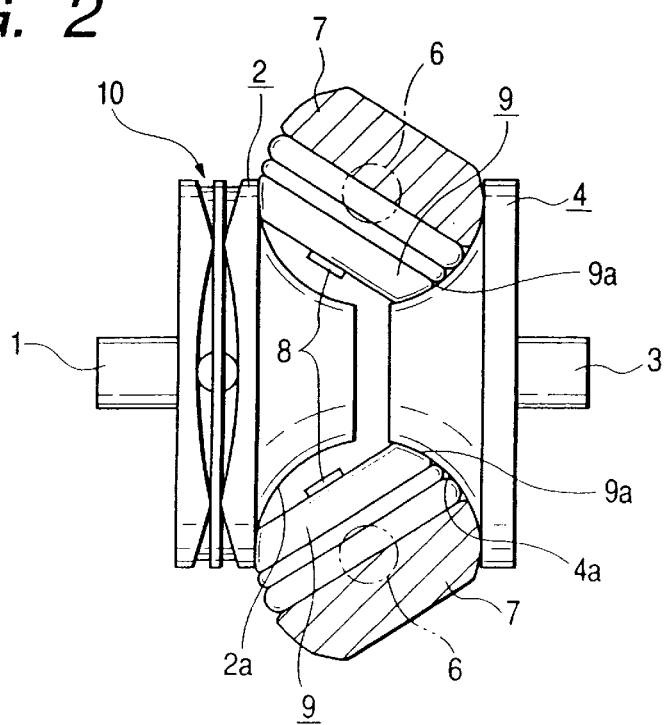
FIG. 2 is a side view of the basic structure of the toroidal type continuous variable speed transmission at the time of maximum acceleration.
Figure 3:
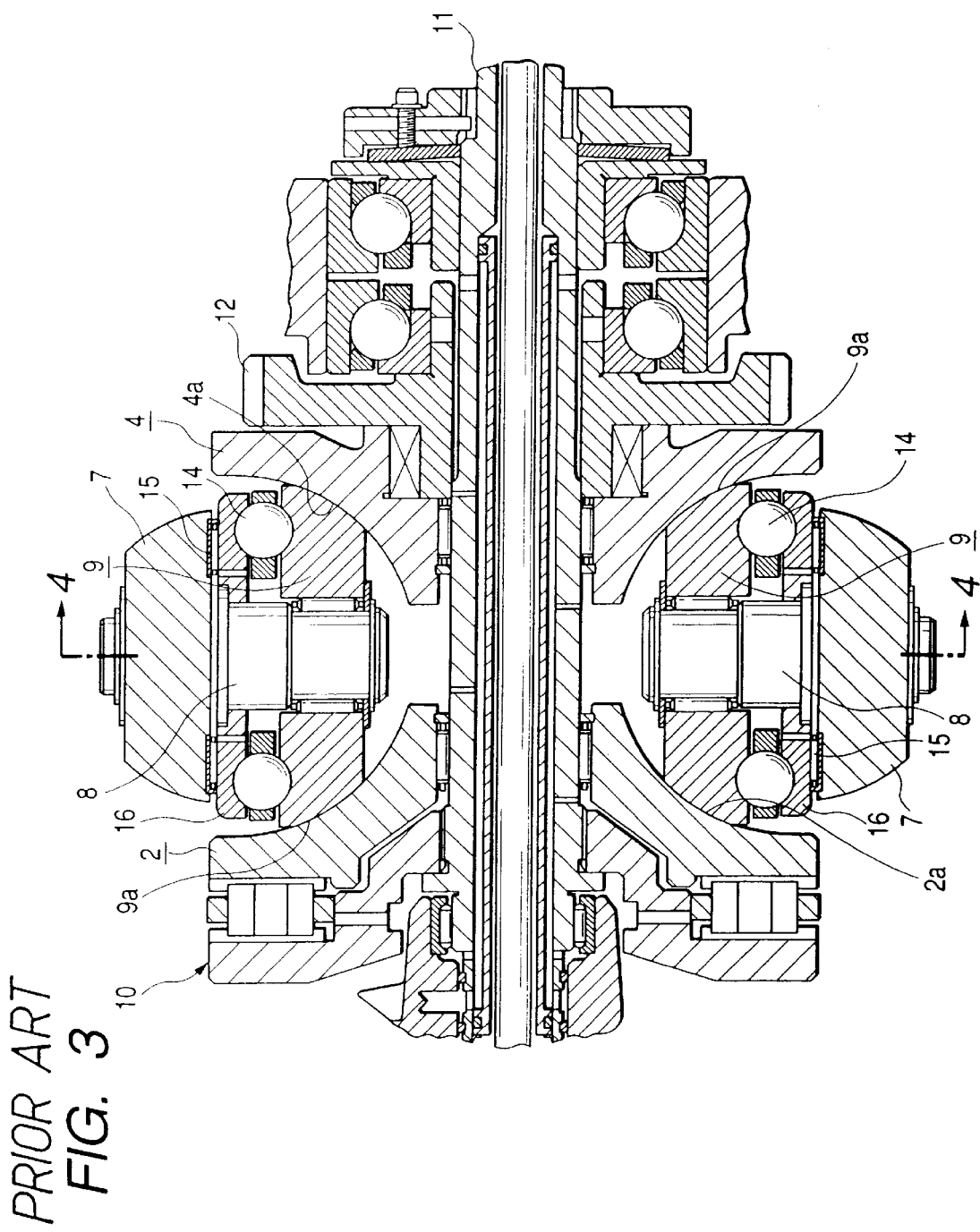
FIG. 3 illustrates a cross-sectional view of the essential part of an example of a specific toroidal type continuous variable speed transmission structure according to the prior art.
Figure 4:
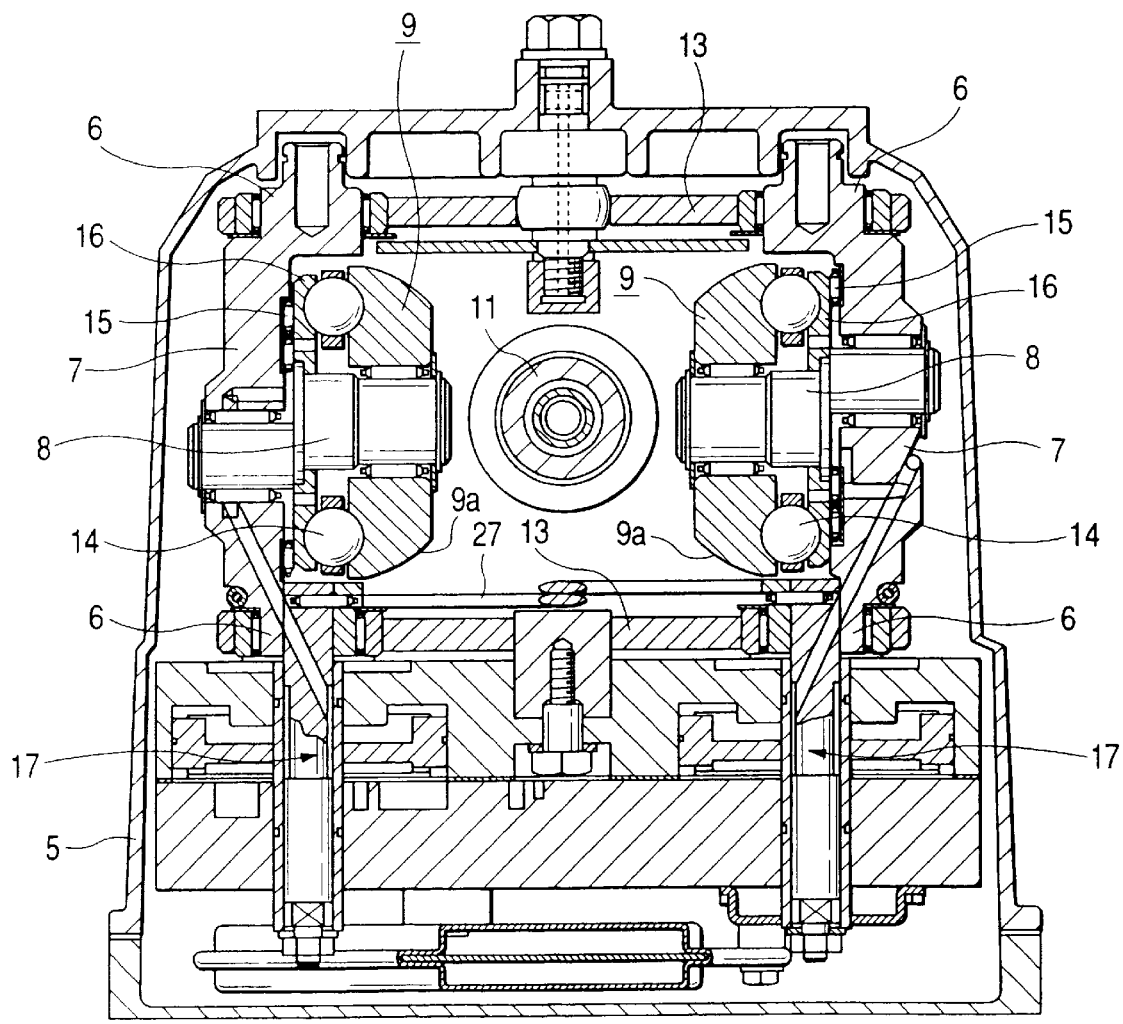
FIG. 4 shows a cross-sectional view of the structure of FIG. 3 taken along the line 4—4.
Figure 5:
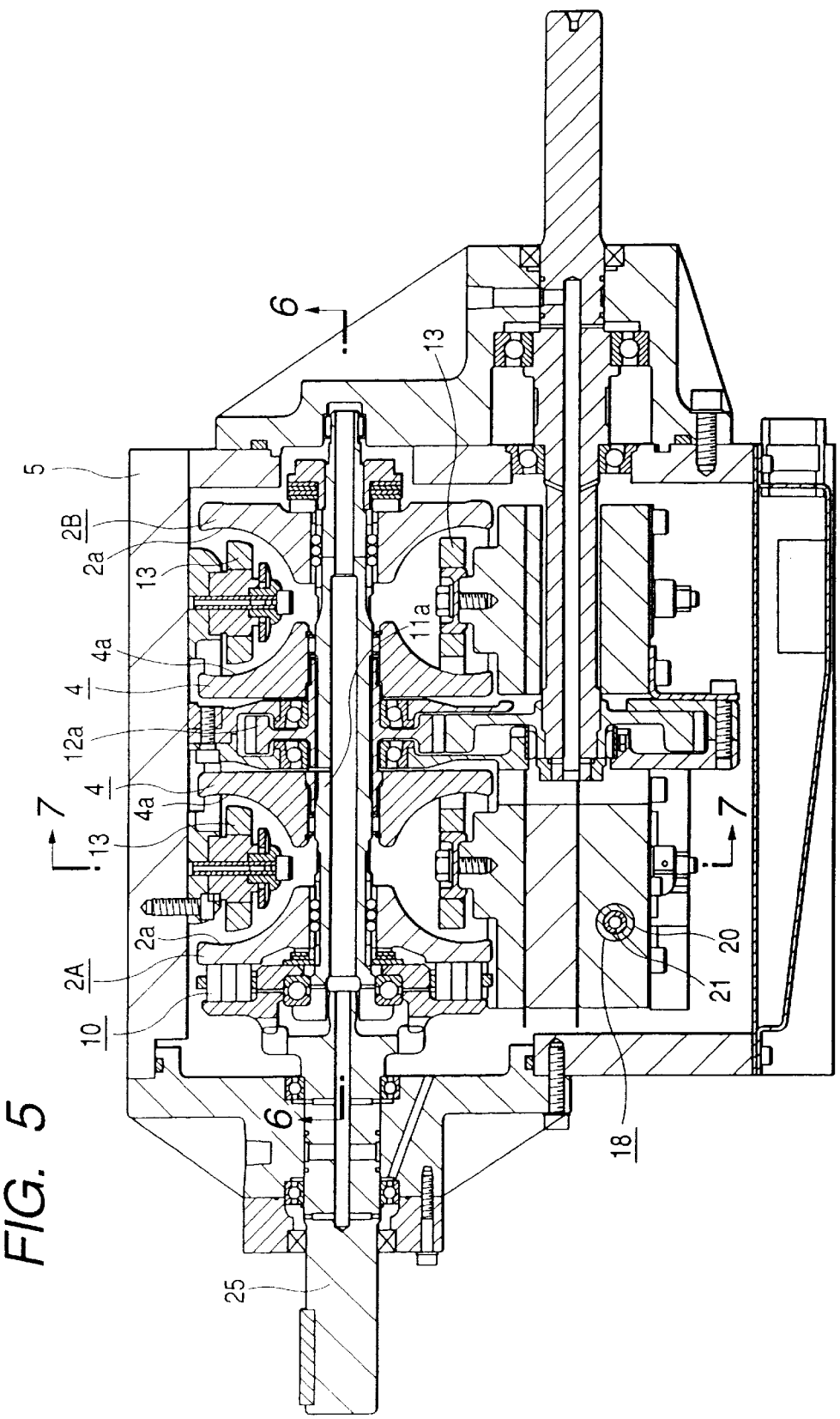
FIG. 5 illustrates a cross-sectional view of the essential part of another example of a specific toroidal type continuous variable speed transmission structure according to the prior art.
Figure 6:
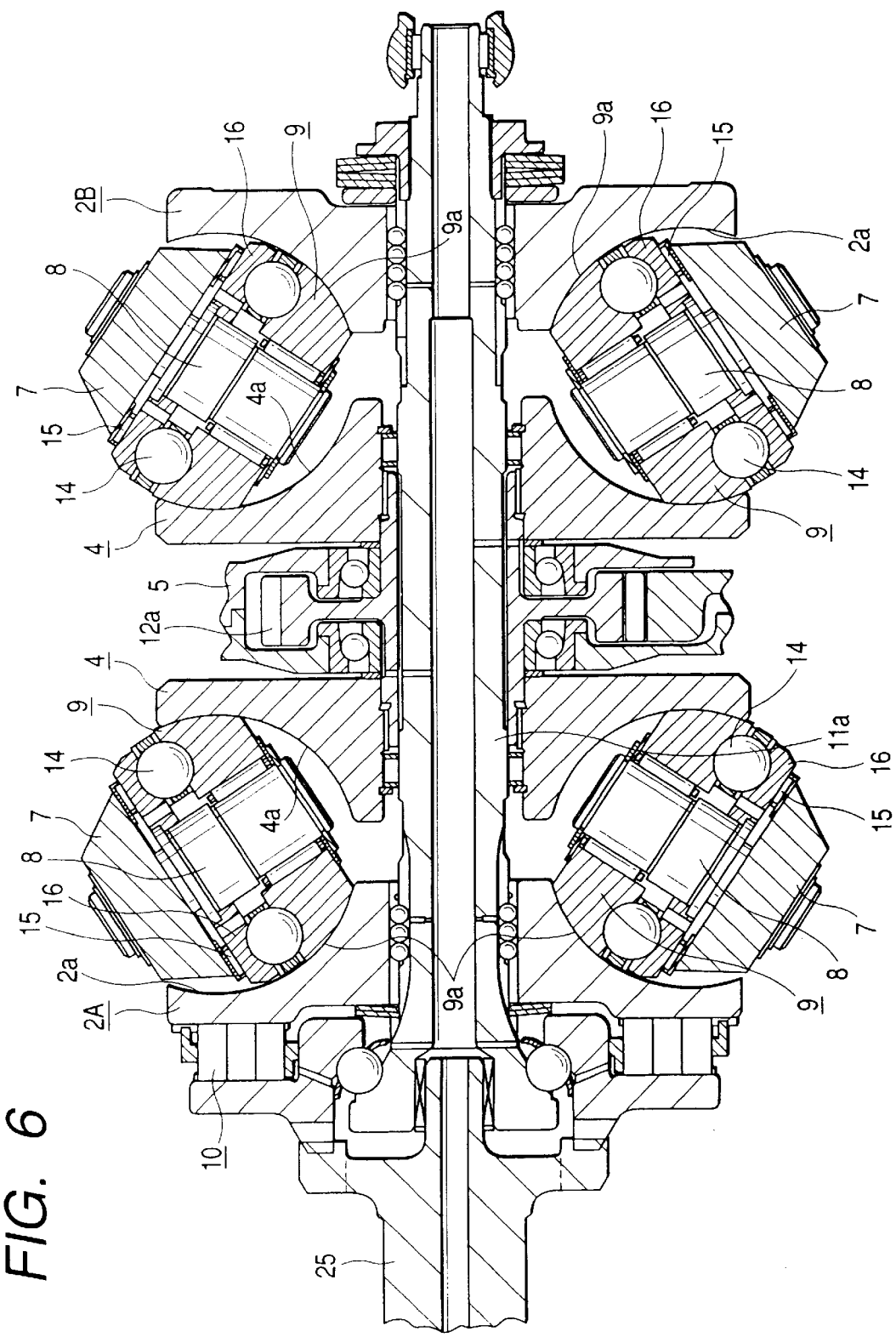
FIG. 6 shows a cross-sectional view of the structure of FIG. 5 taken along the line 6—6.
Figure 7:
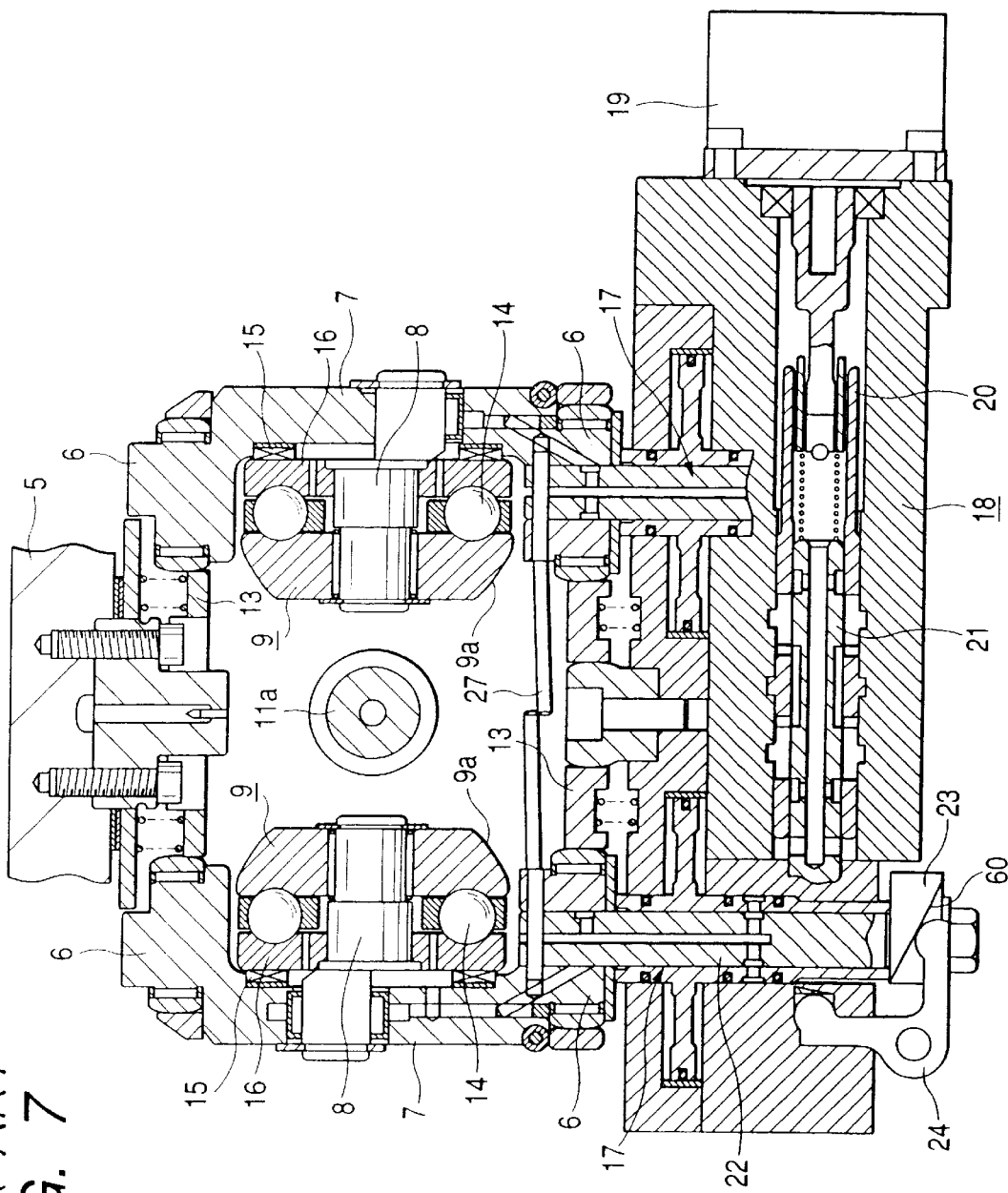
FIG. 7 shows a cross-sectional view of the structure of FIG. 5 taken along the line 7—7.
Figure 8:
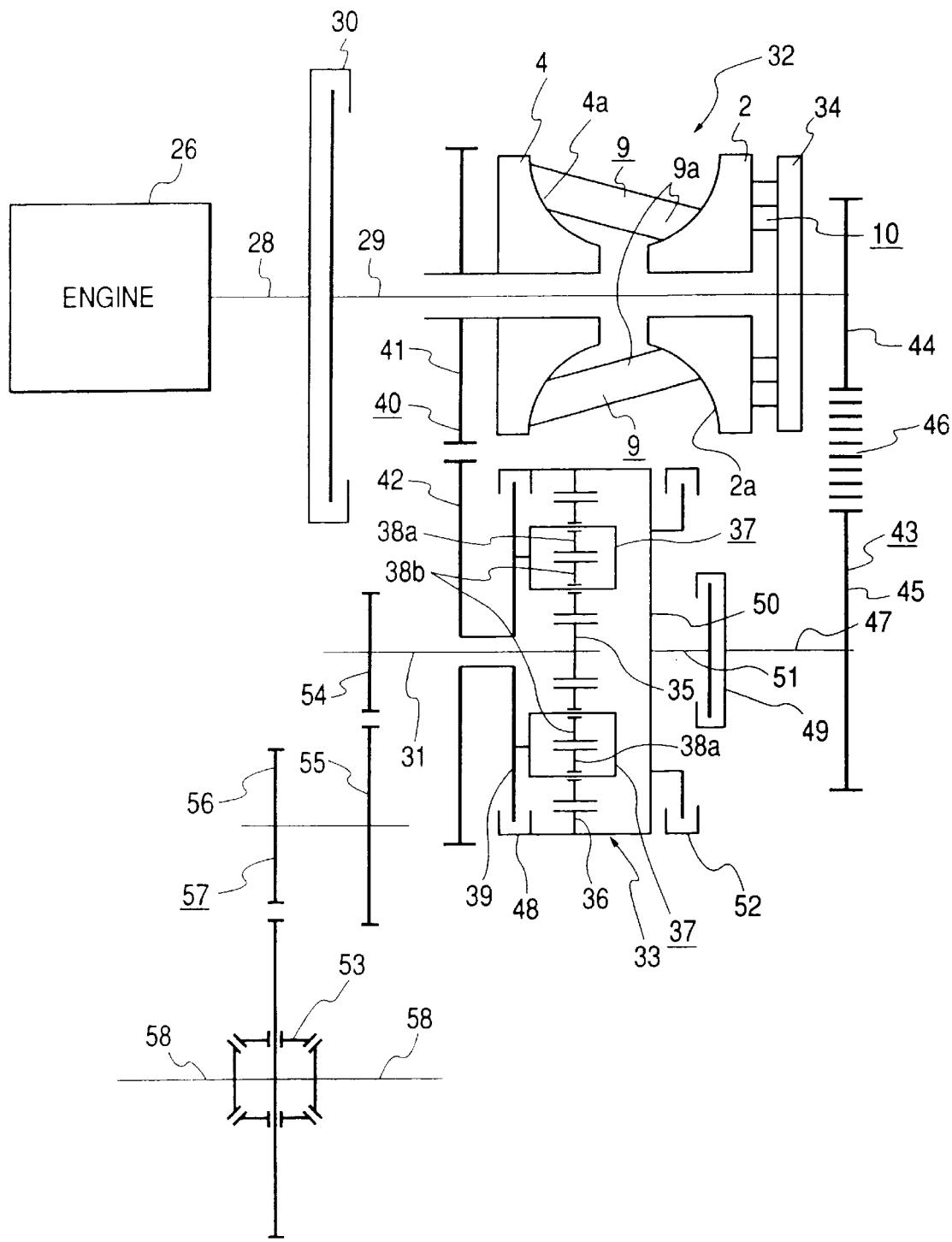
FIG. 8 illustrates a cross-sectional view of one example of continuous variable speed transmission into which a toroidal type continuous variable speed transmission is incorporated.
Figure 9:
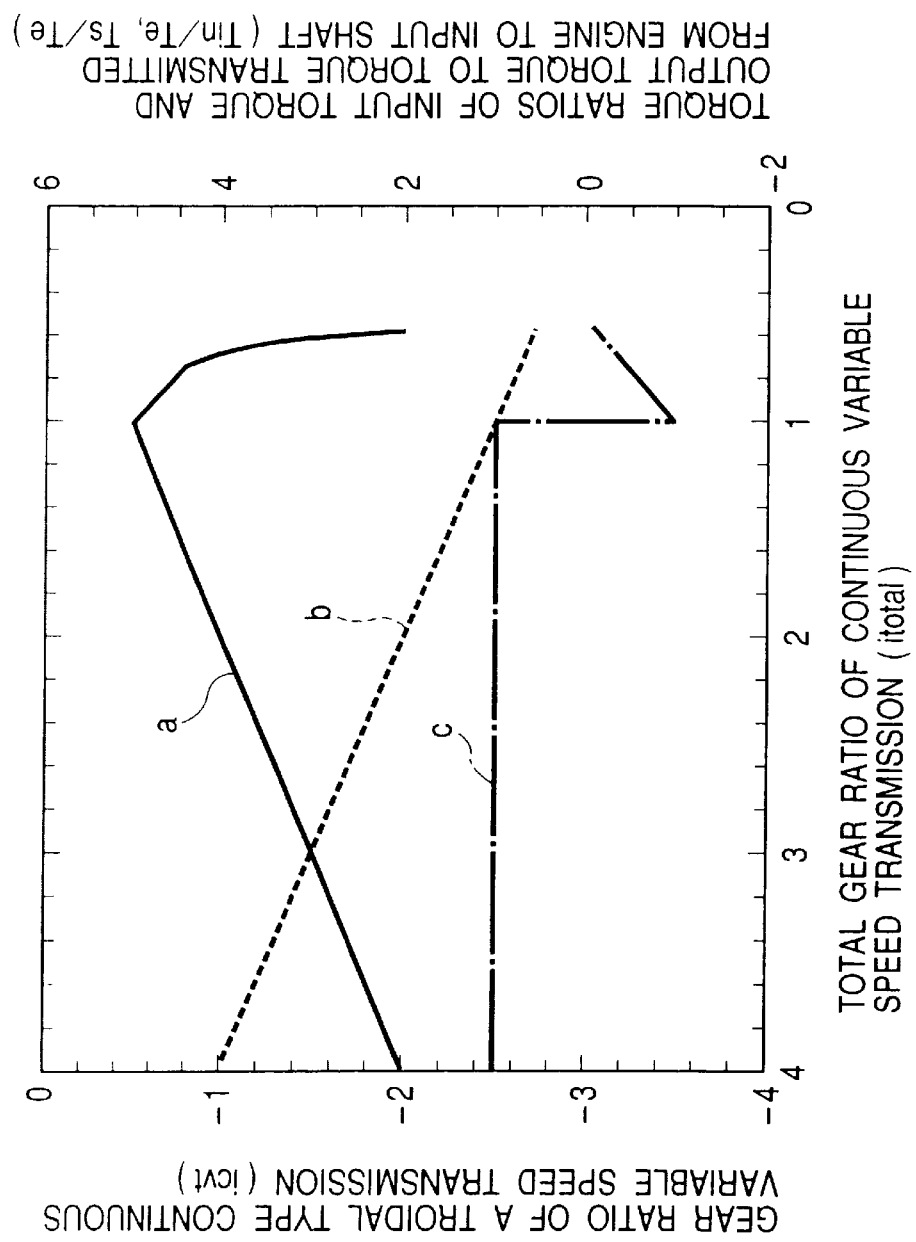
FIG. 9 is a graph showing the relationship among the total gear ratio of the continuous variable speed transmission ratio, the gear ratio of the toroidal type continuous variable speed transmission alone, and the torque ratios of different parts of the system.
Figure 10:
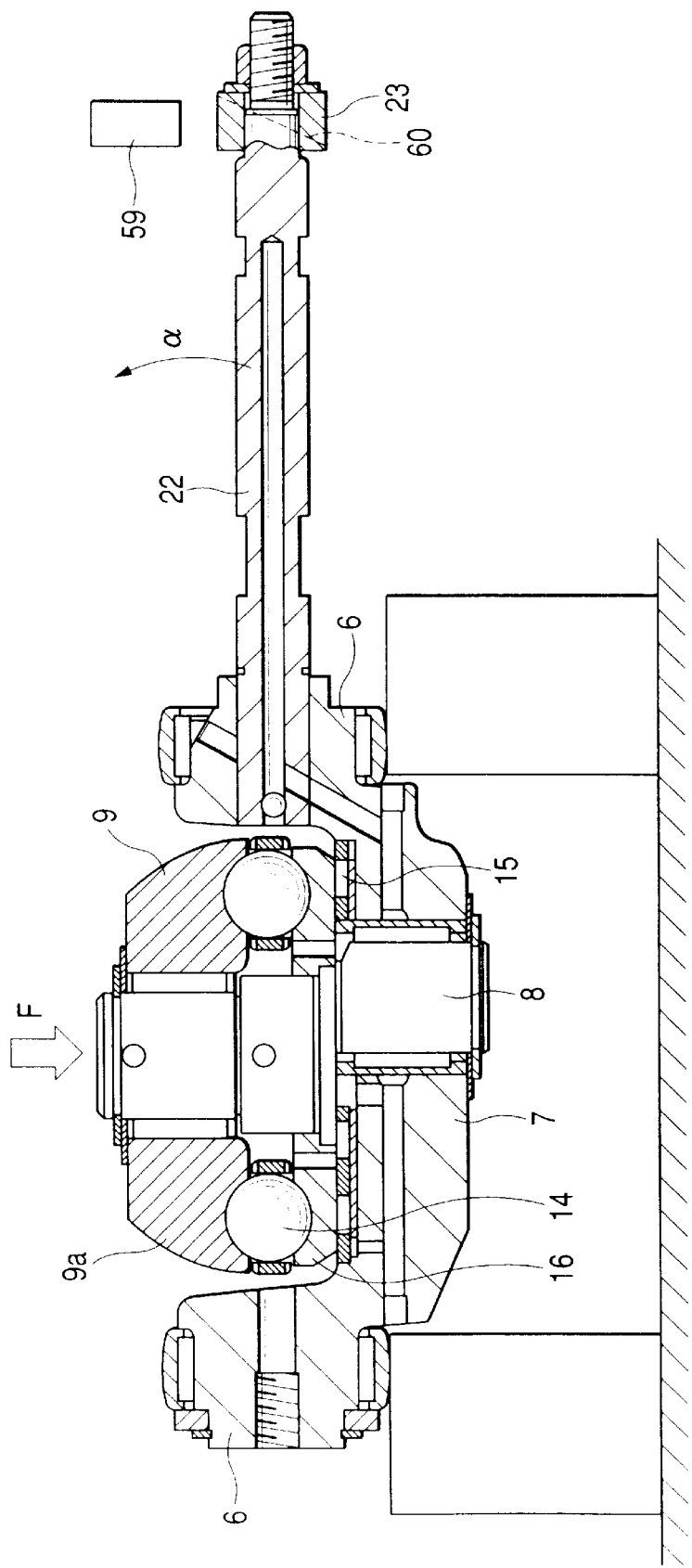
FIG. 10 shows a cross-sectional view for illustrating how an experiment was carried out to measure the displacement of a precess cam based on the deformation of a trunnion.
Figure 11:
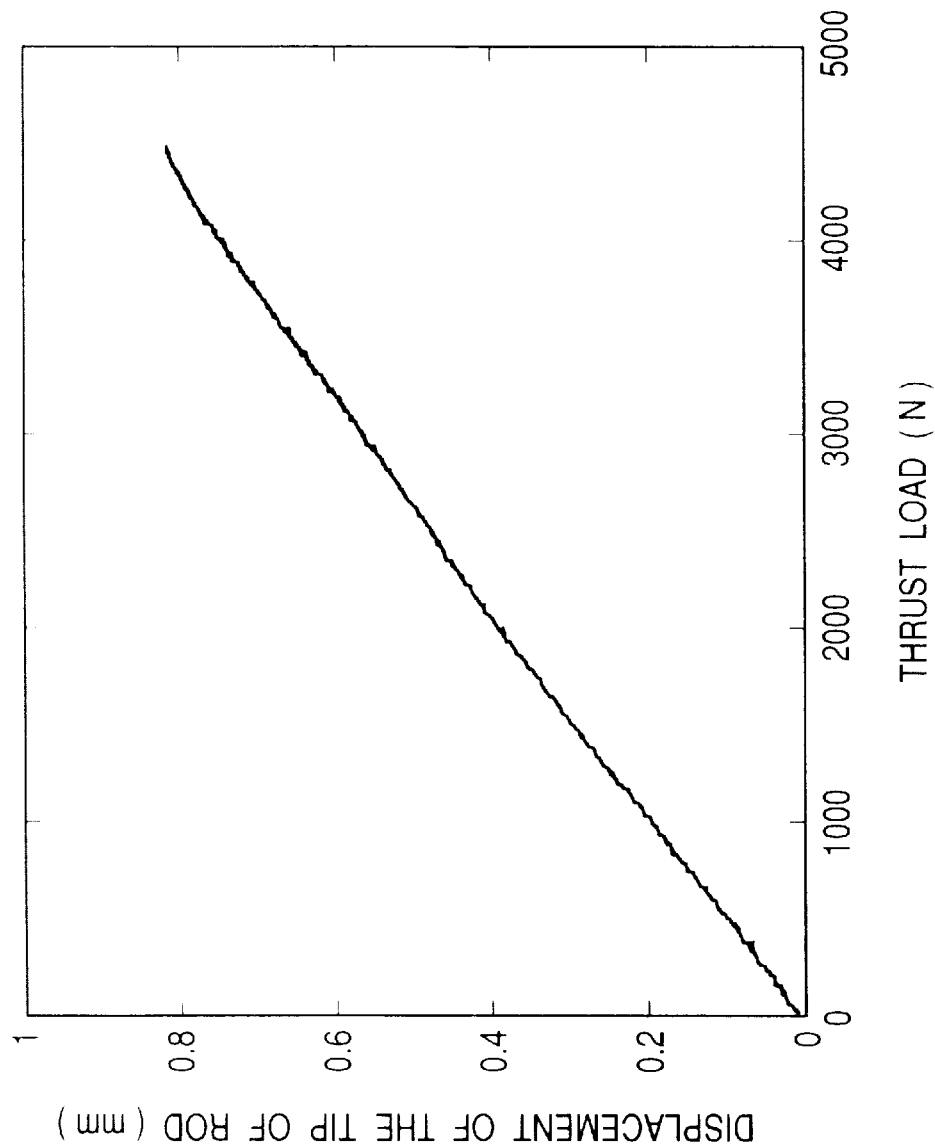
FIG. 11 is a graph showing the relationship between the torque working on trunnions figured out on the basis of experimental results and the displacement of the precess cam.

The toroidal type continuous variable speed transmission according to the present invention is characterized by the regulation of the position of contact between the precess cam 23 and the link arm 24 to suppress gear ratio variations deriving from torque variations. Structures of other illustrated constituent elements and actions to transmit power between the input and output sections or to change the gear ratio between these input and output sections are similar to their respective counterparts in the known toroidal type continuous variable speed transmission described above with reference to FIGS. 3 and 4 and FIGS. 5 through 7 or in the known toroidal type continuous variable speed transmission 32 incorporated into the continuous variable speed transmission illustrated in FIG. 8. Description of similar parts is dispensed with in the following.

Figure 12:
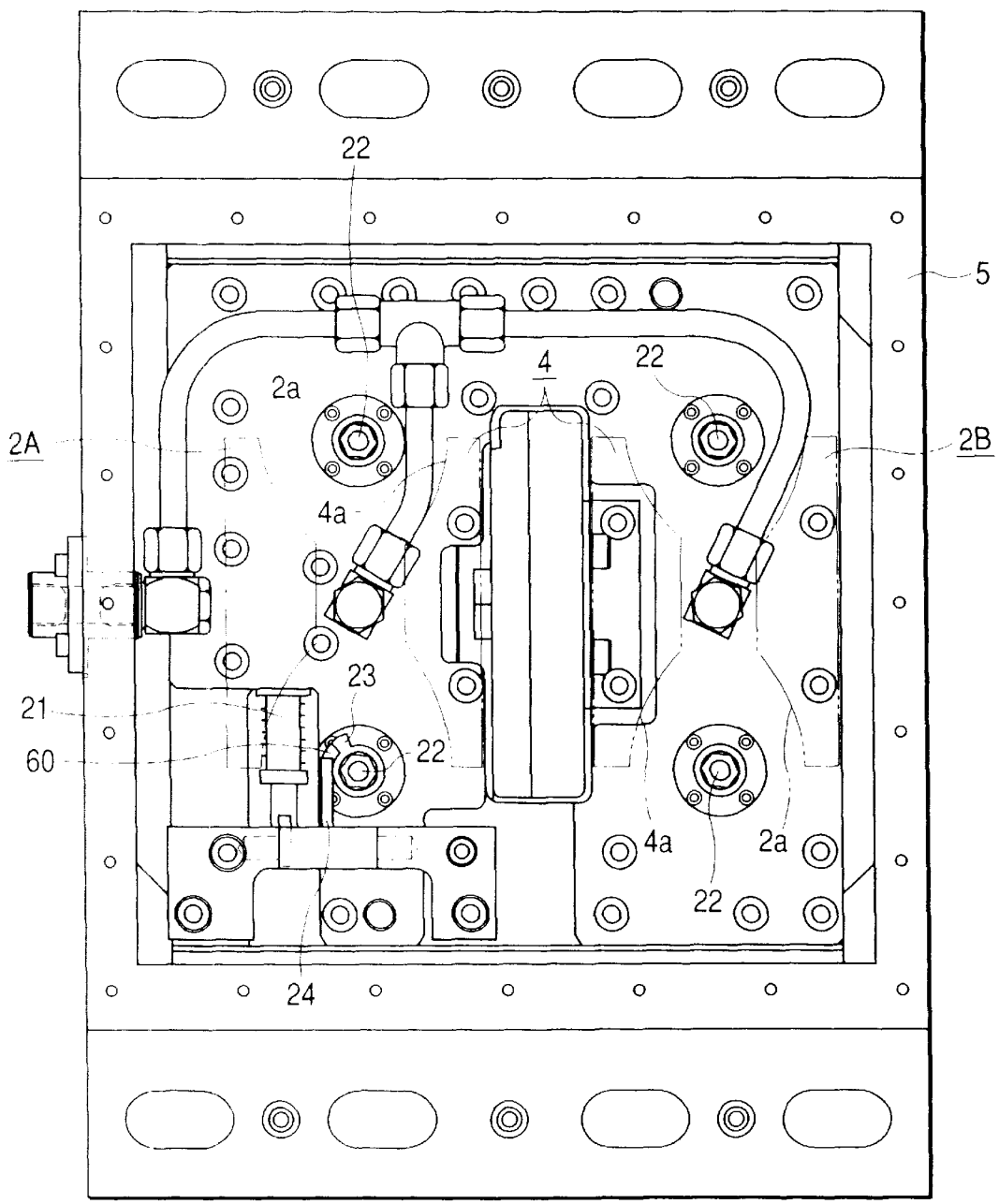
FIG. 12 illustrates a toroidal type continuous variable speed transmission, which is a first preferred embodiment of the present invention.

FIG. 12 illustrates a state in which the invention is implemented in the form of a double cavity toroidal type continuous variable speed transmission described above with reference to FIGS. 5 through 7. In the embodiment shown in FIG. 12, two input side disks 2A and 2B are arranged toward the respectively left and right ends, and two output side disks 4 are arranged toward the center. A precess cam 23 is supported by and fixed to the tip of a rod 22, the one positioned in the bottom left part of FIG. 12, out of four rods 22 the base end of each of which is coupled and fixed to one end of one or another of a total four trunnions, of which two are provided in each cavity. The tip of a link arm 24 is kept in contact with the cam face 60 of this precess cam 23. When the toroidal type continuous variable speed transmission is to change the speed, the rod 22 rotates in the skew direction while being displaced in the axial direction (the direction normal to the surface of FIG. 12), and thereby rotates the link arm 24. A spool 21, which is on a skew line to the rod 22 and constitutes a control valve is displaced in the axial direction (the vertical direction in FIG. 12).

In particular in the toroidal type continuous variable speed transmission according to the invention, the link arm 24 is positioned closer to the input side disk 2A side (the left side in FIG. 12) than the rod 22. Therefore, the position of contact between the cam face 60 of the precess cam 23 and the tip of the link arm 24 is in a position closer to the input side disk 2A than the central axis of the trunnion provided with this precess cam 23, i.e. the central axis of the rod 22.

The toroidal type continuous variable speed transmission according to the invention configured as described above can suppress any variation of the gear ratio due to an abrupt change in torque and thereby reduce a consequent uncomfortable feeling on the part of the driver. That is, experiment by the inventor revealed that, where the position of contact between the cam face 60 of the precess cam 23 and the link arm 24 was placed closer to the input side disk 2A than the central axis of the trunnion provided with the precess cam 23, which is the central axis of the rod 22, the gear ratio variation could be suppressed more than in the case of placing the position of contact elsewhere. This point will be described in further detail with reference to FIGS. 13 through 16.

Figure 13:
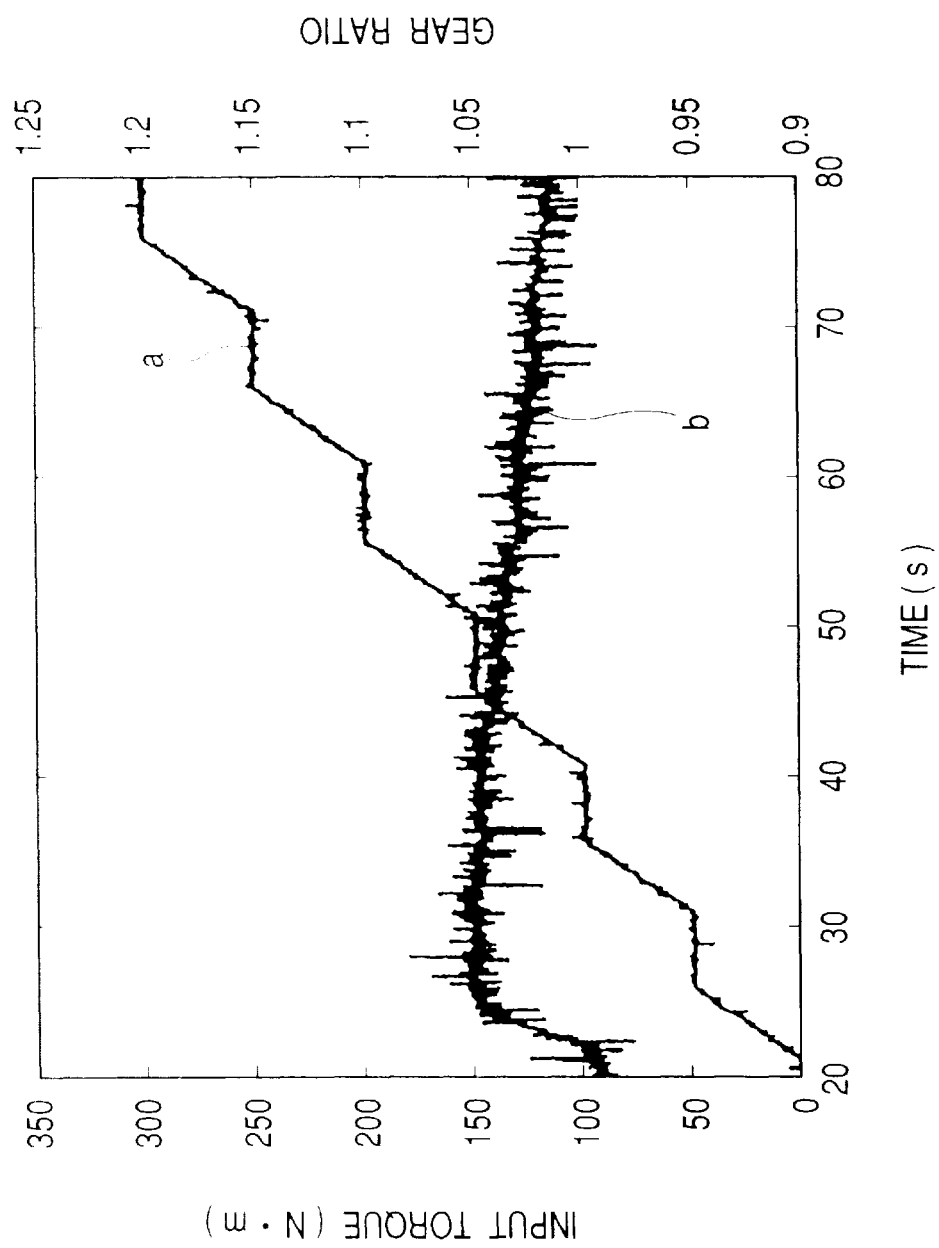
FIG. 13 is a graph showing variations in gear ratio along with input torque variations in the toroidal type continuous variable speed transmission according to the invention.

First, FIG. 13 shows the result of an experiment carried out to know the impact of variations in the torque inputted to a toroidal type continuous variable speed transmission on the gear ratio of this toroidal type continuous variable speed transmission in a structure wherein, as shown in FIG. 12, the position of contact between the cam face 60 of the precess cam 23 and the tip of the link arm 24 is brought closer to the input side disk 2A side. In FIG. 13 showing the result of such an experiment, a curve a represents the magnitude of the torque inputted to the toroidal type continuous variable speed transmission, and a curve b, the gear ratio of this toroidal type continuous variable speed transmission. As is evident from this FIG. 13, in the case of the structure according to the invention, although the gear ratio varies toward the deceleration relatively significantly in the early phase of increasing the input torque, the gear ratio gradually decreases as the torque is further increased. Therefore, the gear ratio does not vary so significantly over the whole range of torque variations.

Figure 14:
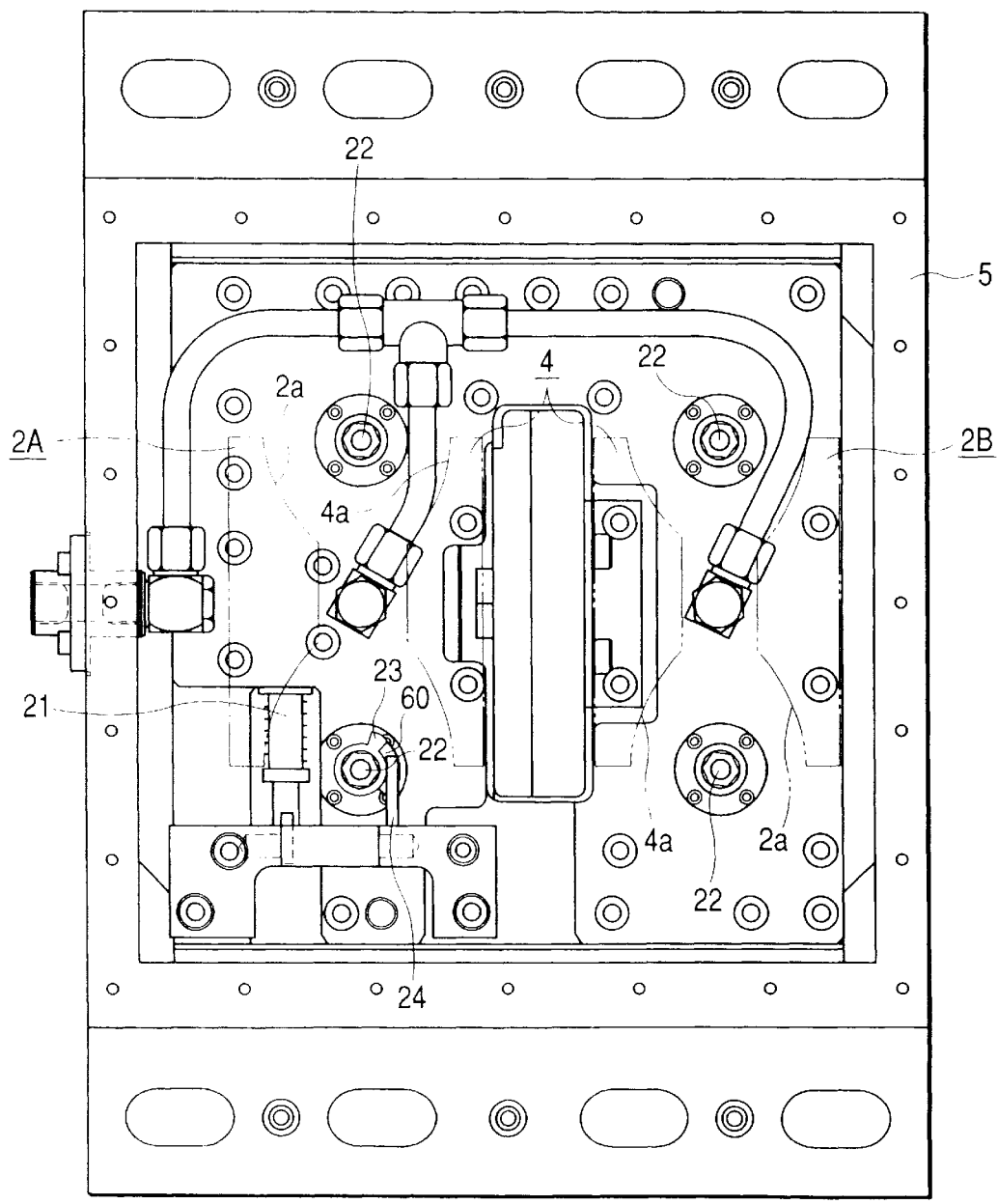
FIG. 14 illustrates the bottom of one example of toroidal type continuous variable speed transmission outside the scope of the invention.
Figure 15:
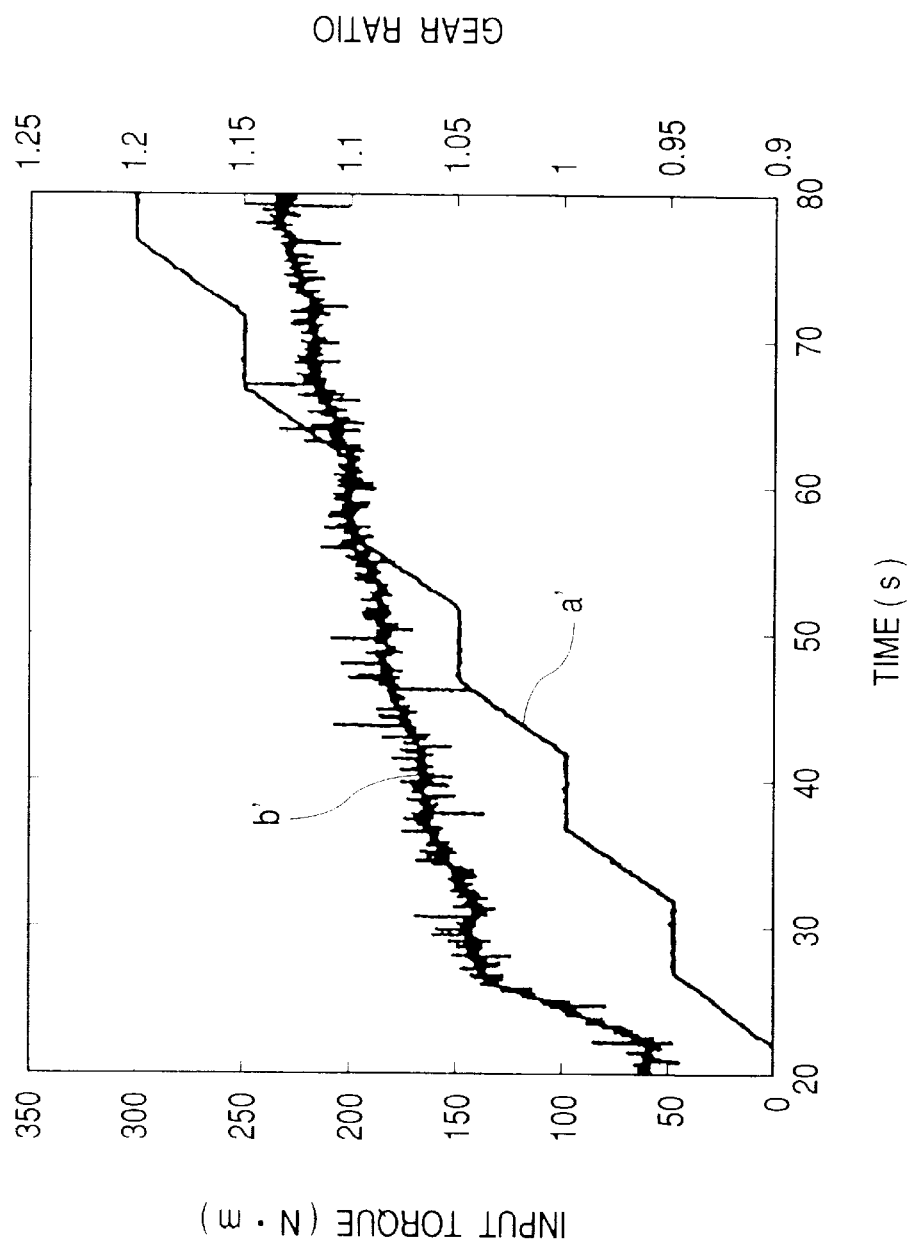
FIG. 15 is a graph showing variations in gear ratio along with input torque variations in the toroidal type continuous variable speed transmission outside the scope of the invention.

FIG. 14 illustrates a toroidal type continuous variable speed transmission in which the position of contact between the cam face 60 of the precess cam 23 and the tip of the link arm 24 is brought closer to the output side disk 4 side. FIG. 15 shows the result of an experiment carried out to know the impact of variations in the torque inputted to a toroidal type continuous variable speed transmission on the gear ratio of the toroidal type continuous variable speed transmission shown in FIG. 14. In the result of such an experiment, a curve a' represents the magnitude of the torque inputted to the toroidal type continuous variable speed transmission, and a curve b', the gear ratio of this toroidal type continuous variable speed transmission. As is evident from this FIG. 15, in the case of the structure deviating from the invention, the gear ratio varies toward the deceleration relatively significantly in the early phase of increasing the input torque, and the gear ratio gradually increases as the torque is further increased. Therefore, the gear ratio varies significantly over the whole range of torque variations.

Figure 16:
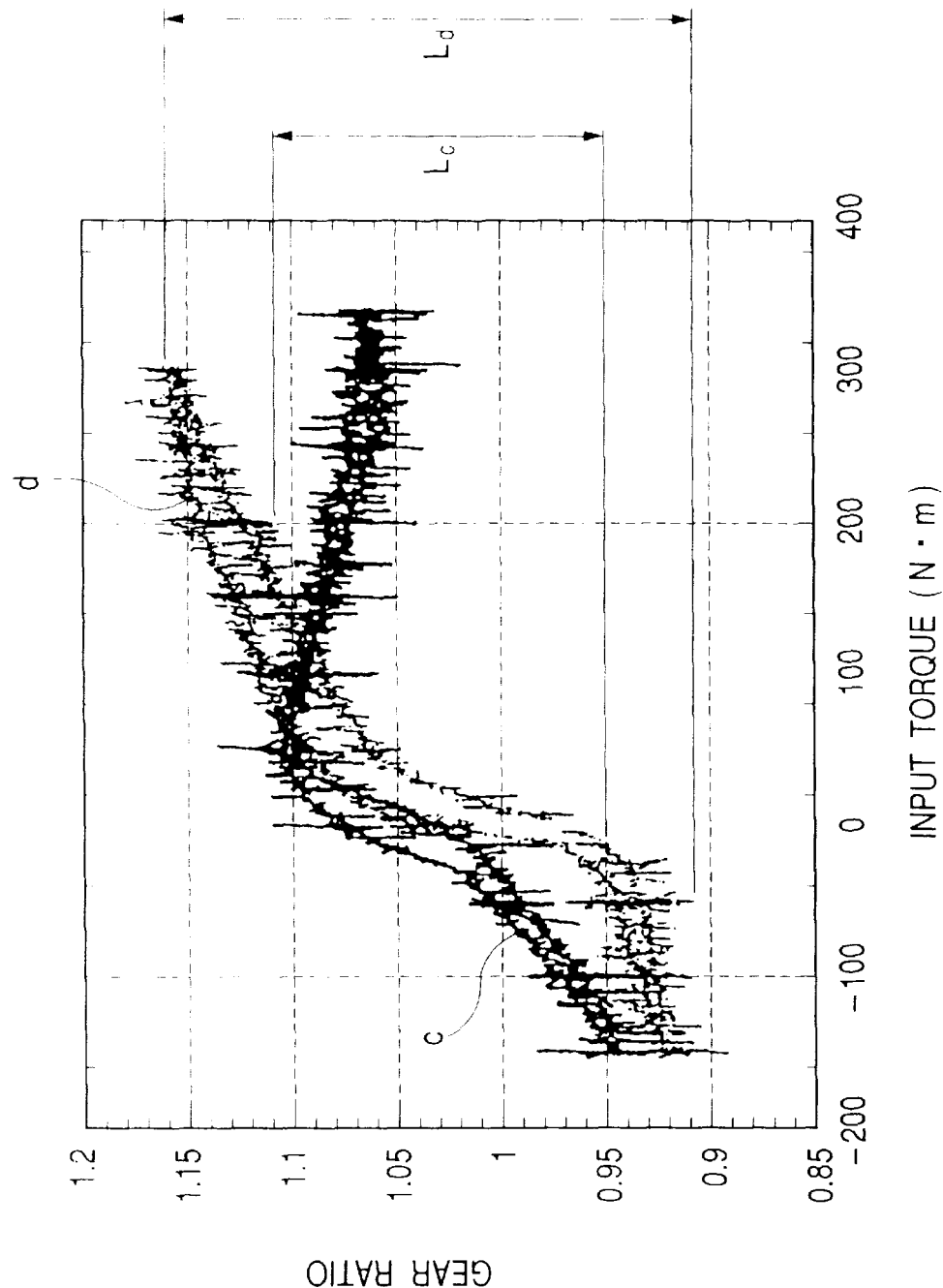
FIG. 16 is a graph showing the relationship between the input torque magnitude and the total gear ratio in the toroidal type continuous variable speed transmission according to the invention and the toroidal type continuous variable speed transmission outside the scope of the invention.

FIG. 16 compares the experimental result regarding the structure according to the invention shown in FIG. 13 and that of the structure deviating from the invention shown in FIG. 15. In this FIG. 16, a curve c represents the gear ratio represented by the curve b in FIG. 13 in terms of its relationship to the torque represented by the curve a in the same graph. A curve d represents the gear ratio represented by the curve b' in FIG. 15 in terms of its relationship to the torque represented by the curve a' in the same graph. As the curves c and d show cases in which the torque is increased and decreased, respectively, the middle parts are double lines based on the hysteresis. As is evident from the comparison of the respective varying ranges Lc and Ld of the curves c and d in this FIG. 16, the structure according to the invention can reduce the range of gear ratio variations deriving from torque variations.

As described so far, the structure according to the invention can reduce the range of gear ratio variations and thereby alleviate the uncomfortable feeling the driver might have. In particular in the continuous variable speed transmission shown in FIG. 8, although the torque inputted to the toroidal type continuous variable speed transmission 32 at the time of mode switching greatly varies including reversing between positive and negative values, the gear ratio variations can be suppressed even in this case. Incidentally, in the continuous variable speed transmission shown in FIG. 8 the switching between the low speed and high speed modes is performed when the gear ratio of the toroidal type continuous variable speed transmission 32 is on the acceleration side. The curves c and d in FIG. 16, for instance, derive from measurement done when the gear ratio of the continuous variable speed transmission was in the vicinity of 1, a similar qualitative tendency is manifested even when the gear ratio is on the acceleration side. Supposing a case in which the torque varies along with mode switching when the gear ratio of the toroidal type continuous variable speed transmission is in the vicinity of 1 (the input torque varies between "+300N·m" and "−150N·m"), while the gear ratio of the structure according to the invention varied only from 1.06 to 0.95, that of the structure deviating from the invention varied more widely, from 1.15 to 0.92. If this gear ratio varies so significantly, control to newly compensate for this variation should be instantaneously effected to prevent the driver from feeling uncomfortable. The greater the variation, the more troublesome this control will be, but the control is facilitated by the structure according to the invention because it can reduce the range of variations.

The foregoing description referred to a so-called power split continuous variable speed transmission system combining a toroidal type continuous variable speed transmission and a planetary gear mechanism, which reduces the toque working on the toroidal type continuous variable speed transmission during high speed running and thereby increases the durability of the constituent elements of the toroidal type continuous variable speed transmission by transmitting the driving force of the engine via the toroidal type continuous variable speed transmission alone during low speed running and transmitting the driving force via the planetary gear mechanism during high speed running. The invention, however, can also be effectively applied to a toroidal type continuous variable speed transmission to be incorporated into a so-called geared neutral continuous variable speed transmission system, which combines a toroidal type continuous variable speed transmission and a planetary gear mechanism and can realize zero output revolutions without having to use a start clutch.

In a geared neutral continuous variable speed transmission system, the rotation of the sun gear of the planetary gear mechanism downstream, for instance, is driven by the output shaft of the toroidal type continuous variable speed transmission, and the rotation of the carrier of the planetary gear mechanism is driven by a circuit bypassing this toroidal type continuous variable speed transmission. In the low speed mode, power is transmitted by the circuit going through the toroidal type continuous variable speed transmission and the circuit bypassing it, and the differential component of the planetary gears is taken out for use as the output. In the high speed mode, on the other hand, power is transmitted by the toroidal type continuous variable speed transmission alone. In such a geared neutral continuous variable speed transmission system, switching between the low speed and high speed modes is performed when the gear ratio of the toroidal type continuous variable speed transmission is on the deceleration side. As the torque working on the toroidal type continuous variable speed transmission is switched between positive and negative values at the time of mode switching in the case of a geared neutral continuous variable speed transmission system as well, the advantage of the invention can be fully achieved.

As hitherto described, according to the invention under the present application, there can be realized a toroidal type continuous variable speed transmission which requires no particularly troublesome control and moreover keeps the driver free from any uncomfortable feeling.

What is claimed is:

1. A toroidal continuous variable speed transmission, comprising:

an input side disk and an output side disk sharing the same center, each having a circular concavity, the inner faces of said disks opposing each other, and each being rotatably supported;

a plurality of trunnions rocking around axes, each axis being skewed with respect to the central axis of the input side disk and output side disk;

displacement shafts supported at middle parts of the respective trunnions so as to project from the inner faces of the trunnions;

power rollers each of which has a spherically convex circumferential face and is supported rotatably around the displacement shaft, the power rollers being positioned at the inner face side of the respective trunnions and put between the input side disk and the output side disk;

hydraulic actuators, each of which is provided on a respective trunnion and varying the gear ratio between the input side disk and the output side disk by a rocking displacement of the trunnion about the axis of the trunnion caused by an axial displacement of the axis of the trunnion; and a control valve for switching the feeding/discharging state of pressurized oil to and from each of the hydraulic actuators, wherein a precess cam is fixed to a member to be displaced together with one of the trunnions;

wherein the motion of the one trunnion is transmitted to the control valve by a feedback mechanism for transmitting the displacement of the precess cam to the control valve with only one link arm to make possible switching of the feeding/discharging state by this control valve for both forward and reverse drive; and wherein the position of contact between the precess cam and the link arm is closer to the input side disk than the position of the central axis of the trunnion provided with the precess cam.

2. A toroidal continuous variable speed transmission according to claim 1, wherein the toroidal continuous variable speed transmission is incorporated into a continuous variable speed transmission apparatus, wherein the continuous variable speed transmission apparatus comprises:

an input shaft connected to a driving force source and rotationally driven by the driving force source;

an output shaft for taking out power deriving from the rotation of the input shaft;

a planetary gear mechanism including a sun gear, ring gear arranged around the sun gear, and planetary gears engaged with the sun gear and the ring gear, the planetary gears being arranged between the sun gear and the ring gear and rotatably supported by a carrier rotatably supported concentrically with the sun gear;

a first power transmission path for transmitting power, which is inputted to the toroidal continuous variable speed transmission, the planetary gear mechanism and said input shaft, via the toroidal continuous variable speed transmission; and a second power transmission path for transmitting power inputted to said input shaft without the toroidal continuous variable speed transmission;

wherein the planetary gear mechanism makes power fed via said first power transmission path and power fed via said second power transmission path transmissible to two items out of said sun gear, said ring gear and said carrier and couples said output shaft with the remaining one item, wherein a mode switching member is provided to switch to and from a state in which power inputted to said input shaft is fed to said planetary gear mechanism via said first power transmission path and said second power transmission path, and wherein the mode switching member performs switching at least between a first mode in which power is transmitted over said first power transmission path alone and a second mode in which power is transmitted over both the first power transmission path and the second power transmission path.

3. A toroidal continuous variable speed transmission according to claim 1, wherein the input side disk rotates only in one direction for forward and reverse drive.

* * * * *